(12) United States Patent
Schramm

(10) Patent No.: US 7,553,117 B2
(45) Date of Patent: Jun. 30, 2009

(54) RECEIVING ELEMENT

(75) Inventor: Peter Schramm, Naila (DE)

(73) Assignee: Friatec Aktiengesellschaft, Manheim (DE)

(*) Notice: Subject to any disclaimer, the term of this patent is extended or adjusted under 35 U.S.C. 154(b) by 642 days.

(21) Appl. No.: 11/196,810

(22) PCT Filed: Jan. 28, 2004

(86) PCT No.: PCT/EP2004/000734
§ 371 (c)(1), (2), (4) Date: Oct. 14, 2005

(87) PCT Pub. No.: WO2004/069468
PCT Pub. Date: Aug. 19, 2004

(65) Prior Publication Data
US 2008/0213033 A1 Sep. 4, 2008

(30) Foreign Application Priority Data
Feb. 7, 2003 (DE) ................. 103 05 214

(51) Int. Cl.
F16B 15/00 (2006.01)
(52) U.S. Cl. ...................... 411/441; 411/954
(58) Field of Classification Search .............. 411/383, 411/385, 215–217, 441, 954, 451.1, 452, 411/451.4; 376/364
See application file for complete search history.

(56) References Cited

U.S. PATENT DOCUMENTS

| 157,636 | A | * | 12/1874 | Roberts | 411/217 |
| 1,177,780 | A | * | 4/1916 | Kessel | 411/216 |
| 1,364,298 | A | * | 1/1921 | Nies | 411/216 |
| 3,064,773 | A | * | 11/1962 | Linecker | 52/521 |

FOREIGN PATENT DOCUMENTS

| JP | 2-290696 | 11/1990 |
| JP | 4-019031 | 1/1992 |
| JP | 4-019032 | 1/1992 |
| JP | 11-280721 | 10/1999 |

* cited by examiner

Primary Examiner—Gary Estremsky
(74) Attorney, Agent, or Firm—Jordan and Hamburg LLP

(57) ABSTRACT

The invention relates to a receiving element comprising a bolt with an external surface that is essentially parallel to and in particular coaxial with a longitudinal axis. Said bolt can be introduced into a bore of at least one component, preferably at least two components in order to fix and/or align said component(s) for subsequent machining. The aim of the invention is to develop the receiving element whilst maintaining a simple construction in order to ensure a high dimensional stability and positioning precision over a long service life. To achieve this, the bolt comprises at least two recesses containing orifices in the vicinity of its external surface, said recesses containing pins, which consist of or comprise wear-resistant sintered material, extend through said orifices in a partial radial manner and project beyond the external surface with a predefined overhang.

11 Claims, 2 Drawing Sheets

RECEIVING ELEMENT

BACKGROUND OF THE INVENTION

The invention relates to a receiving element that contains a bolt that can be inserted into a bore of at least one component for fixing and/or aligning for subsequent processing. For instance, if two sheet metal parts are to be joined to one another by welding, corresponding receiving bores are introduced in them in which subsequently the receiving element is inserted for centering and receiving the sheet metal parts. In particular in the case of large components, a plurality of such receiving elements is usefully provided as production or assembly means. Such receiving elements can also be employed as holding pins and/or guide pins in machines, systems, or component processing systems, these including for example welding machines, punch machines, or presses.

The receiving elements generally comprise steel in their entirety and are subject to great wear. In order avoid spark discharges during electric welding, for instance in a welding machine, additional measures for insulation must be undertaken. In addition, such receiving elements can be used for guiding and/or aligning at least one component, especially a sheet metal part, during other production measures such as for instance in a press, punch machine, or the like, whereby there is substantial wear even when high-quality steel is used and with respect to narrow production tolerances the standing times of such receiving elements is short so that significant time and expense are required for the necessary exchange and replacement of the receiving elements.

Starting at this point, the object of the invention is to further develop the receiving element with low design complexity such that high dimensional stability and positioning accuracy are assured for a long service life. The manufacture of the receiving elements should require low complexity and/or material consumption and should be economically feasible. Furthermore, the electrical insulation required for producing a weld joint in the sheet metal parts should be assured.

BRIEF SUMMARY OF THE INVENTION

The suggested receiving element is distinguished by a simple and functionally appropriate structure. In the area of its exterior surface and partially beyond it the bolt contains projecting pins made of wear-resistant sintered material, preferably oxide ceramic, such as in particular $AL_2O_3$, $ZrO_2$, $Si_3N_4$, and mixtures thereof. In the area of the exterior surface the bolt contains seats, in particular embodied as grooves, that are for the aforesaid pins made of sintered material. In addition, the receiving element preferably comprises steel and is produced in a known manner by means of turning and/or milling machines. The aforesaid pins are produced by mechanical processing, dry pressing, extrusion, or in an injection molding process and are introduced into and/or fastened in a suitable manner as parts in the prepared recesses or seats corresponding to the exterior contour thereof, which are arranged as bores or grooves in the area of the exterior surface of the bolt.

The pins, comprising wear-resistant sintered material, preferably have a solid cross-section, whereby the closed sectional surface is formed largely constant across the entire length of the pins, apart from end surfaces in the area of the tip of the bolt and/or receiving element. Pins embodied with such a solid cross-section and/or such solidly embodied pins thus enable functionally assured receiving and transmission of high external loads, such as pressure and shock loads, during the processing of the components in the bores or orifices of which the receiving elements are inserted.

The pins are preferably inserted into the seats of the bolt with a comparatively large portion of their cross-section, preferably more than 50%, in particular more than 80%. After the insertion of the pins that are made of sintered material and are arranged with a prespecified overhang over the preferred cylindrical exterior surface of the bolt, the pins are processed by mechanical processing, in particular cylindrical grinding, to the required orifice diameter of the component or sheet metal part to be processed in order to assure a precise fit. Thus tolerances and/or impreciseness in the production of the at least two pins and their introduction into and fastening in the seats of the bolt are compensated in a simple manner. In accordance with the invention, those surface areas of the pins that project the farthest radially beyond the preferably cylindrical exterior surface of the bolt lie on a common lateral surface that is in particular cylindrical and/or coaxial to the longitudinal axis of the bolt.

The pins comprising sintered material can have a solid cross-section or given lower demands can have a tube-like cross-section, whereby the exterior contour is preferably cylindrical, but in the framework of the invention it can also be oval, polygonal, or the like. The pins are inserted into the correspondingly designed seats of the bolt and fastened there, in particular by gluing, contraction, pressing, or clamping. In addition, the at least two pins are preferably arranged distributed evenly across the exterior circumference of the rod, whereby in the case of two pins these are preferably arranged diametrically opposite one another. In the case of three pins, these are each preferably arranged offset 120° about the longitudinal axis and relative thereto or in the case of four pins these are preferably arranged offset 90° about the longitudinal axis and relative thereto. The number of pins is determined according to operational demands. It should be stated that electrical insulation is advantageously provided by means of the pins comprising sintered material.

Particular further developments and designs of the invention are indicated in the subordinate claims and in the following description of preferred exemplary embodiments.

BRIEF DESCRIPTION OF THE DRAWINGS

The invention will be explained in greater detail in the following using the exemplary embodiments depicted in the drawings, without this resulting in any restriction, in which.

DETAILED DESCRIPTION OF THE INVENTION

Figure 1:
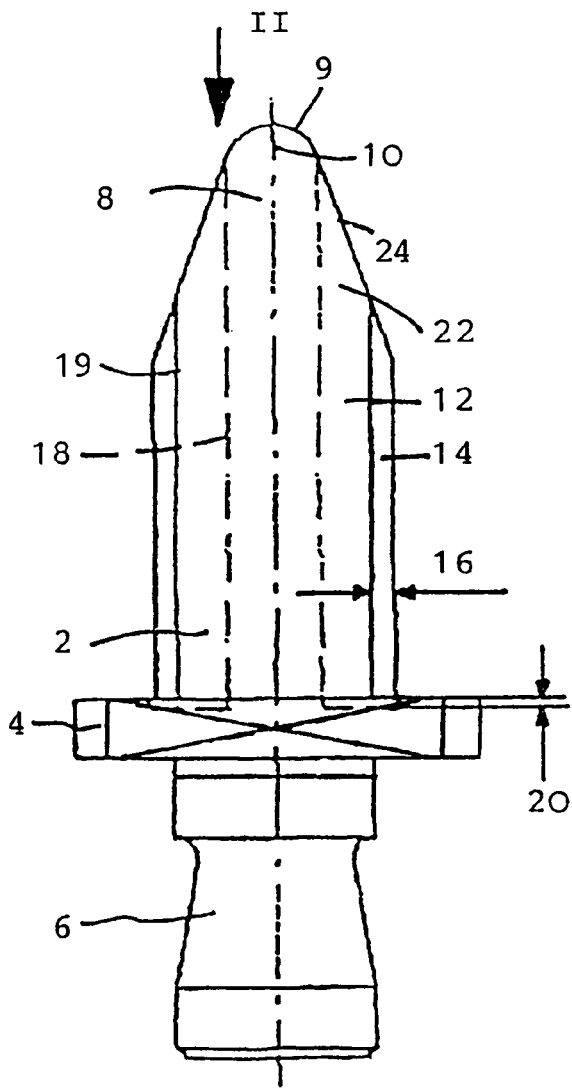
FIG. 1 is a side elevation of the receiving element.

FIG. 1 is a side elevation of a receiving element with a bolt 2, a flange 4, and an end part 6, whereby the bolt 2 in accordance with the drawing at the top has a conical tip 8 that is usefully provided at the end with a rounding 9. The tip 8 facilitates inserting the bolt into a bore or an orifice of the component or components to be processed (not shown). The flange 4 goes adjacent to the component or components. The bolt 2 has an exterior surface 12 that is preferably coaxial to the longitudinal axis 10 and/or cylindrical. Arranged in the area of the exterior surface 12 are inventive pins 14 made of wear-resistant sintered material that project with a prespecified overhang 16 over the exterior surface 12. As can be seen, two pins 14 are arranged diametrically opposite one another and largely parallel to the longitudinal axis 10, but in the framework of the invention another number of pins that are distributed relative to the longitudinal axis 10 around the circumference can be provided, in particular that are evenly distributed around the circumference.

The pins 14 are each partially arranged in recesses or seats 18 that are preferably parallel to the axis in the area of the exterior surface 12 of the bolt 2. The recesses or seats 18 are designed open in the radial direction outward such that the pins 14 partially project in the radial direction out of the recesses 18 through orifices 19 and project over the exterior surface 12. The recesses 18 are preferably designed undercut in order to assure reliable fixing of the pins in each recess. In accordance with the undercut design of the recesses 18, the measured width of each orifice 19 in the circumferential direction in the area of exterior surface 12 is less than the measured width of each pin 14 within the recess 18. For instance, if the pin 14 has a circular cross-sectional area, the cited width of the orifice 19 is less than the diameter of the pin 14. Because of the undercut design of the recess 18, functionally assured and/or secure fixing of the pin 14 in the recess 18 is provided. These seats 18 are usefully embodied as bores or as longitudinal slots and preferably reach with a prespecified depth 20 into the flange 4, this advantageously attaining enhanced fastening of the pins 14.

Apart from their section 22 located in the area of the tip 8, the individual pins 14 have a largely constant cross-section. In the area of the tip 8, the end surfaces 24 of the section 22 and/or the pins 14 are adapted to the exterior contour of the tip 8 and/or designed analogous with it and on a slant in the embodiment in accordance with FIG. 1. The pins 14 are affixed in the seats 18 in a suitable manner and in particular are glued, affixed by contraction, pressed, or clamped therein. The undercut recesses 18 extend to the tip 8 and/or are embodied open in the area of the tip 8. Thus the pins 14 can be inserted into the undercut recesses 18 with no problem for assembly from the front, i.e., the area of the tip 8. The end surfaces 24 can be adapted to the exterior contour of the tip 8 prior to inserting the pin 14 into the associated recess 18 or after insertion. In the latter case, the end surfaces 24 can be adapted to the exterior contour of the tip 8 with no problem. In particular what turning or grinding achieves at low production cost is that the end surfaces 24 lie on the same lateral surface as the other exterior surface areas of the tip 8. Since the end surfaces 24 lie on the same exterior contour as the other surface areas of the tip 8, when the receiving element is inserted into a bore of a component to be processed there is no need to worry about jamming or tilting.

Figure 2:
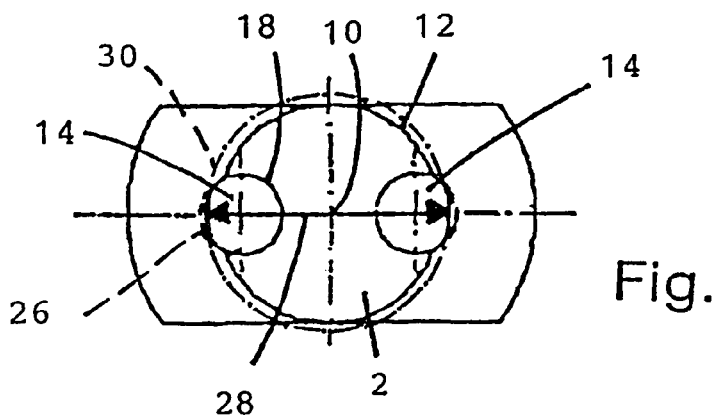
FIG. 2 is an axial elevation of the receiving element in viewing direction II in accordance with FIG. 1.

FIG. 2 illustrates an axial elevation of the receiving element with the two pins 14 arranged diametrically opposing one another in the bolt 2. The pins 14 have a largely circular cross-section, whereby the majority of the sectional surface is disposed within the recesses 18. Thus it is assured that the pins 14 are securely held and fastened in the bolt 2. As already explained, the pins 14 project outward radially beyond the exterior surface 12 with the prespecified overhang 16. The pins 14, comprising wear-resistant sintered material or ceramics, preferably have a continuous solid cross-section, that is, they do not contain any hollow interior space. The inventively solidly embodied pins made of wear-resistant sintered material thus withstand high pressure loads and/or shock loads during processing of the cited components.

As indicated with the dashed line 26, after being placed in the recesses 18, the pins initially project a somewhat greater distance beyond the exterior surface 12. In particular by mechanical processing such as cylindrical grinding the outside areas of the pins 14 have been brought precisely to the diameter 24 of the orifices of the components, in particular sheet metal parts, that are aligned or centered by means of the receiving elements. In the case of the receiving element produced inventively in this manner, the surface parts of the pins 14 that project farthest over the exterior surface 12 lie on a common, preferably cylindrical lateral surface 30 that is coaxial to the longitudinal axis 10 and that is indicated with the dashed line. However, the end surfaces 24 of the pins 14 and/or their end sections 22 are arranged on the same exterior contour or exterior surface of the tip 8 of the bolt 2.

The exterior surface 12 of the bolt 2 is preferably cylindrical. Nevertheless, in the framework of the invention the bolt 2 can have an exterior surface or contour that deviates from this such as for instance an oval or polygonal shape. Regardless of the specific design of the exterior surface, it is inventively embodied such that it lies within the lateral surface mentioned above. Furthermore, in the inventive receiving element in the circumferential direction between the pins the radial exterior surface of the bolt 2 is free, whereby the surface areas of the pins that project the farthest outward in the radial direction project beyond the exterior surface with the prespecified overhang.

Figure 3:
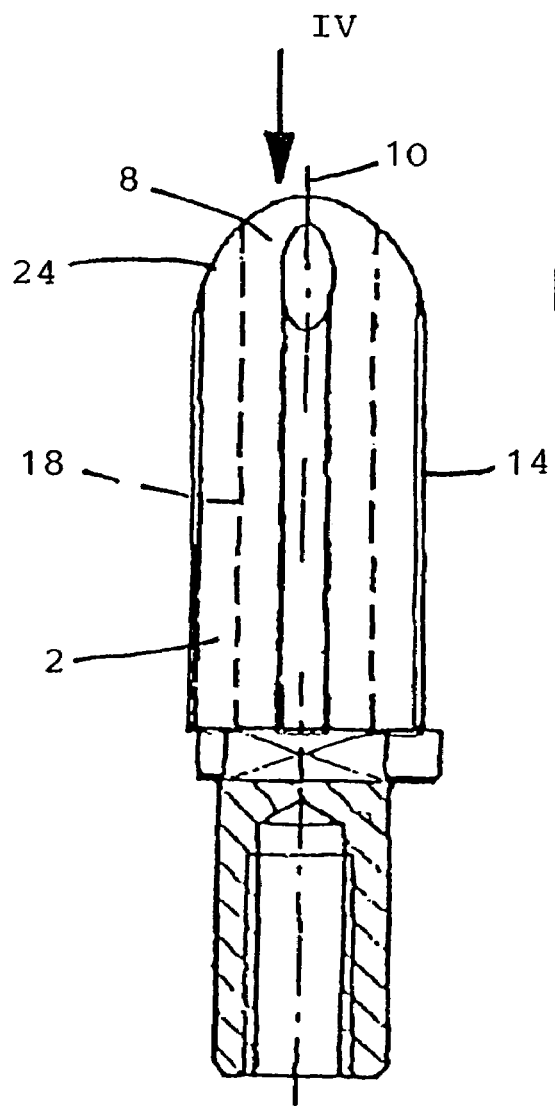
FIG. 3 is a side elevation of another receiving element.
Figure 4:
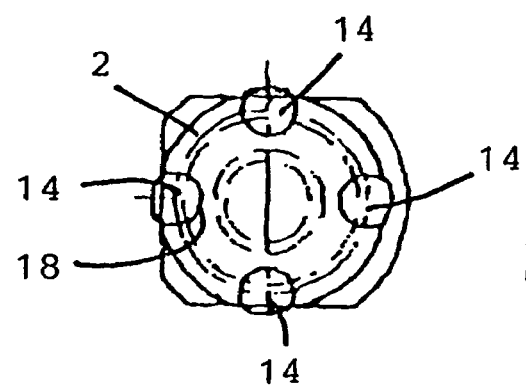
FIG. 4 is an axial elevation of the receiving element in viewing direction IV in accordance with FIG. 3.

FIGS. 3 and 4 illustrate another exemplary embodiment of the receiving element in lateral and axial elevations. The receiving element contains four sintered or ceramic pins 14 that in the area of the exterior surface of the bolt 2 are arranged offset to one another by 90° with regard to the longitudinal axis 10. The pins 14 terminate in the area of the tip 8, whereby the end surfaces 24 of the pins 14 have the same exterior contour as the tip 8 of the bolt 2, specifically in particular due to the common final processing after inserting the pins 14 into the undercut recesses 18 of the bolt 2.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

The invention claimed is:

1. A receiving element, comprising:
a bolt including an exterior surface which is generally coaxial with a longitudinal axis of the bolt, said bolt being insertable into a bore of one or more components, said bolt including at least two axially extending recesses having axially extended openings in said exterior surface; and
pins comprising wear-resistant sintered material, said pins being longitudinally arranged in respective ones of said recesses, said pins partially radially passing through said openings so as to project a predetermined distance beyond said exterior surface, the recesses each being formed with an undercut such that a width of each of said axially extended openings of said recesses is less than a width of a corresponding one of said pins, said undercut serving to captively retain said pins in said recesses.

2. The receiving element according to claim 1, wherein each of said pins is solid and/or comprises a solid cross-section.

3. The receiving element according to claim 2, wherein each of the pins includes an axial pin tip and a substantially radially constant cross-section below said axial pin tip over a substantial entirety of an axial extent thereof.

4. The receiving element according to claim 3, wherein:
said bolt includes an axial bolt tip, said axial bolt tip defining an exterior contour; and
said axial pin tip is disposed against said axial bolt tip, said axial pin tip including a contour defined by said axial bolt tip.

5. The receiving element according to claim 1, wherein:
an axially extending virtual cylindrical surface is collectively defined by a radially outermost surface portion of each pin;
said virtual cylindrical surface extends coaxially to said bolt exterior surface; and
said exterior surface of said bolt is disposed radially inward of said virtual cylindrical surface.

6. The receiving element according to claim 1, wherein each of the pins is disposed within a respective one of the recesses by more than 50% of a cross-sectional area of each of the pins.

7. The receiving element according to claim 1, wherein each pin is distributed evenly around a circumference of said exterior surface of said bolt compared to each other of the pins.

8. A receiving element, comprising:
a bolt including an axially extending exterior surface, said bolt being insertable into a bore of one or more components:
said bolt including at least two axially extending recesses each radially disposed against said bolt exterior;
each of said recesses containing a pin, each said pin extending partially radially beyond said bolt exterior, each said pin being formed of a wear-resistant sintered material;
said sintered material of each said pin comprising oxide ceramics including one or more of $AL_2O_3$, $ZrO_2$, or $Si_3N_4$; and
said bolt and/or said receiving element further comprising metal.

9. The receiving element according to claim 8 wherein said bolt and/or said receiving element is steel.

10. A receiving element, comprising:
a bolt including an axially extending exterior surface, said bolt being insertable into a bore of one or more components;
said bolt including at least two axially extending recesses each radially disposed against said bolt exterior;
each of said recesses containing a pin, each said pin extending partially radially beyond said bolt exterior, each said pin being formed of a wear-resistant sintered material;
said bolt including a flange; and
said recesses being disposed at a predetermined depth into said flange.

11. A receiving element, comprising:
a bolt including an axially extending exterior surface, said bolt being insertable into a bore of one or more components;
said bolt including at least two axially extending recesses each radially disposed against said bolt exterior;
each of said recesses containing a pin, each said pin extending partially radially beyond said bolt exterior, each said pin being formed of a wear-resistant sintered material and comprising a solid cross-section, each said pin being disposed within a respective one of said recesses by 80% of cross-sectional area of said pin.

* * * * *